United States Patent
Crandall et al.

(10) Patent No.: US 7,263,220 B2
(45) Date of Patent: Aug. 28, 2007

(54) METHOD FOR DETECTING COLOR OBJECTS IN DIGITAL IMAGES

(75) Inventors: David J. Crandall, Rochester, NY (US); Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 687 days.

(21) Appl. No.: 10/377,362

(22) Filed: Feb. 28, 2003

(65) Prior Publication Data

US 2004/0170318 A1    Sep. 2, 2004

(51) Int. Cl.
*G06K 9/00* (2006.01)
(52) U.S. Cl. .................................... 382/165
(58) Field of Classification Search ............... 382/165
See application file for complete search history.

(56) References Cited

U.S. PATENT DOCUMENTS

| | | | |
|---|---|---|---|
| 6,246,790 B1 * | 6/2001 | Huang et al. | 382/162 |
| 6,430,312 B1 * | 8/2002 | Huang et al. | 382/165 |
| 6,477,272 B1 | 11/2002 | Krumm et al. | 382/170 |
| 6,584,221 B1 * | 6/2003 | Moghaddam et al. | 382/165 |
| 6,611,622 B1 * | 8/2003 | Krumm | 382/170 |
| 6,801,657 B1 * | 10/2004 | Cieplinski | 382/164 |
| 7,039,229 B2 * | 5/2006 | Lin et al. | 382/165 |
| 7,062,084 B2 * | 6/2006 | Messing et al. | 382/165 |
| 7,065,521 B2 * | 6/2006 | Li et al. | 707/3 |

OTHER PUBLICATIONS

Spatial color indexing and applications; Jing Huang; Kumar, S.R.; Mitra, M.; Wei-Jing Zhu; Computer Vision, 1998. Sixth International Conference on; Jan. 4-7, 1998 pp. 602-607.*

"Detecting Faces in Images: A Survey" by M.-H. Yang, D. Kriegman, N. Ahuja. IEEE Transactions on Pattern Recognition and Machine Intelligence, vol. 24:1, pp. 34-58, 2002.
"Clothes People Detection in Still Images" by N. Sprague and J. Luo. Proceedings of the International Conference on Pattern Recognition, 2002.
"Body Plans" by D.A. Forsyth and M.M. Fleck. Proceedings of IEEE International Conference on Computer Vision and Pattern Recognition, 1997.
"Morphology-based License Plate Detection from Complex Scenes" by J.-W. Hsieh, S.-H. Yu, Y.-S. Chen. Proceedings of the International Conference on Pattern Recognition, 2002.
"A Model-Based Road Sign Identification System" by Y. Lauzier, D. Gingras, F. Ferrie. In Proceedings of the IEEE Conference on Computer Vision and Pattern Recognition, 2001.
"A Statistical Method for 3D Object Detection Applied to Faces and Cars" by H. Schneiderman and T. Kanade. Proceedings of the IEEE Conference on Computer Vision and Pattern Recognition, 2000.
"Rotation Invariant Neural Network-Based Face Detection" by H. Rowley, S. Baluja, T. Kanade. Proceedings of the IEEE Conference on Computer Vision and Pattern Recognition, 1998.
"Color Indexing" by M. Swain and D. Ballard. International Journal of Computer Vision, (7), 1, pp. 11-32, 1991.
"Pedestrian Detection Using Wavelet Templates" by M. Oren, C. Papageorgiou, P. Sinha, E. Osuna, T. Poggio. Proceedings of the IEEE Conference on Computer Vision and Pattern Recognition, 1997.

(Continued)

*Primary Examiner*—Wenpeng Chen
*Assistant Examiner*—Yuzhen Ge
(74) *Attorney, Agent, or Firm*—Robert Luke Walker

(57) ABSTRACT

A method for detecting an object in a digital image including the steps of performing color quantization on a model image including the object and on a search image that potentially includes the object, generating a plurality of search windows, computing spatial-color joint probability functions of each model and search image, where the color co-occurrence edge histogram is chosen to be the spatial-color joint probability function, assessing the similarity of each search image to the model, and designating search windows as containing the target object.

12 Claims, 15 Drawing Sheets

OTHER PUBLICATIONS

"Appearance-based Object Recognition Using Multiple View" by A. Selinger, R.C. Nelson. Proceedings of the IEEE Conference on Computer Vision and Pattern Recognition, 2001.

"Comparing Images Using the Hausdorff Distance" by D.P. Huttenlocker, G.A. Klanderman, and W.J. Ricklidge. IEEE Transactions on Pattern Analysis and Machine Intelligence, (15), pp. 850-863, 1993.

"Pedestrian registration in static images with unconstrained background" by L. Fan, K.-K. Sung, T.-K. Ng. Pattern Recognition, (36), 2003, pp. 1019-1029.

"Active appearance models" by T.F. Cootes, G.J. Edwards, and C.J. Taylor. Proceedings of the European Conference on Computer Vision, pp. 484-498, 1998.

"Image Indexing Using Color Correlograms" by J. Huang, S. Kumar, M. Mitra, W.-J. Zhu, R. Zabih. Proceedings of the IEEE Conference on computer Vision and Pattern Recognition, pp. 762-768, 1997.

Peng Chang et al: "Object Recognition with Color Cooccurrence Histograms" Computer Vision and Patten Recognition, vol. 2, Jun. 23, 1999, pp. 498-504, XP010347534.

Qasim Iqbal et al: "Combining Structure, Color and Texture for Image Retrieval: A Performance Evaluation", Pattern Recognition, 2002. Proceedings, 16th International Conference of Quebec City, Quebec, Canada, Aug. 11-15, 2002, Los Alamitos, CA., USA, IEEE Comput. Soc., US, vol. 2, Aug. 11, 2002, pp. 438-443, XP010613914, ISBN: 0-7695-1695-X.

Jing Huang, S. Ravi Kumar, Mandar Mitra, Wei-Jing Zhu and Ramin Zabih: "Spatial Color Indexing and Applications" International Journal of Computer Vision, vol. 35, No. 3, 1999, pp. 245-268, XP009055664.

George Gagaudakis and Paul L. Rosin: "Incorporating Shape Into Histograms for CBIR", Pattern Recognition, 2002, pp. 81-91, XP009055562.

* cited by examiner

METHOD FOR DETECTING COLOR OBJECTS IN DIGITAL IMAGES

FIELD OF THE INVENTION

The invention relates generally to the field of digital image processing and, more particularly, to a method for detecting a color object in a digital image.

BACKGROUND OF THE INVENTION

Object detection in consumer images is an important image analysis task. In particular, an algorithm that could detect and recognize objects in images would allow a computer to automatically extract a large amount of semantic information from an image, in effect simulating what a human sees when viewing an image. The semantic information could be employed to improve upon a wide range of image understanding applications, such as automatic image categorization, scene classification, image orientation determination, etc.

Despite years of research attention, there has been little success in creating a single computer algorithm that can reliably detect an arbitrary object in unconstrained images. The best that can be attained in the current state-of-the-art is to build separate algorithms for specific objects or classes of objects or under certain conditions, e.g. faces (M.-H. Yang, D. Kriegman, N. Ahuja. Detecting Faces in Images: A Survey. In *IEEE Transactions on Pattern Recognition and Machine Intelligence*, vol. 24:1, pp. 34-58, 2002), human bodies (N. Sprague and J. Luo. Clothed People Detection in Still Images. In *Proceedings of the International Conference on Pattern Recognition*, 2002), horses (D. A. Forsyth and M. M. Fleck. Body Plans. In *Proceedings of IEEE International Conference on Computer Vision and Pattern Recognition*, 1997), license plates (J.-W. Hsieh, S.-H. Yu, Y.-S. Chen. Morphology-based License Plate Detection from Complex Scenes. In *Proceedings of the International Conference on Pattern Recognition*, 2002), cars in satellite photos (H. Moon, R. Chellappa, A. Rosenfeld. Optimal Edge-Based Shape Detection. In *IEEE Transactions on Image Processing*, (11) 11, Nov. 2002), road signs (Y. Lauziere, D. Gingras, F. Ferrie. A Model-Based Road Sign Identification System. In *Proceedings of the IEEE Conference on Computer Vision and Pattern Recognition*, 2001).

Building object detection algorithms is typically time-consuming and labor-intensive. There are two basic approaches that are often taken to building a detection algorithm for a new object or object class. The first is to collect a large amount of image data containing the object and train a learning engine on the ground truth data (e.g. H. Schneiderman and T. Kanade. A Statistical Method for 3D object detection applied to faces and cars. In *Proceedings of the IEEE Conference on Computer Vision and Pattern Recognition*, 2000, and H. Rowley, S. Baluja, T. Kanade. Rotation Invariant Neural Network-Based Face Detection. In *Proceedings of the IEEE Conference on Computer Vision and Pattern Recognition*, 1998). However, collecting a large amount of ground truth is time-consuming and for some objects may be difficult or impossible. Also, a significant amount of human effort is required to design the learning engine and select appropriate image features. Another approach is to use human intuition to write rules for finding the object. Unfortunately, this is also labor intensive and requires experts rather than simply operators, and the resulting detector is very specialized: a completely new set of new rules must be written for each type of object.

This invention considers the detection of compound color objects, which we define as objects having a specific set of multiple colors that are arranged in a unique and constant spatial layout, subject to global and local deformations that change the appearance of the object in an image. This is a relatively wide class of objects that includes, for example, flags, cartoon characters, logos, uniforms, signs, etc. This problem is non-trivial because the appearance of compound color objects may vary drastically from scene to scene. Objects like flags and logos often appear on flexible material, and their appearances change as the material distorts. For example, a flag is subject to self-occlusion and non-affine distortion depending on wind conditions. Since orientation of images is not always known and many compound color objects do not have fixed orientations, the detector must be invariant to rotation. It should also be robust to color shifts due to illuminant changes and color differences from object to object.

In the design of any object detection system, one must choose a suitable representation that is used for comparing the object model to an input image. The choice of representation is typically a function of the types of distortions that are expected in the object across different images. For example, if one expects dramatic color variations in an object, a representation based on image edges might be chosen (e.g., Moon, Chellappa and Rosenfeld), while if dramatic spatial variations are expected, a representation using global color histograms might be wise (e.g. M. Swain and D. Ballard. Color Indexing. *International Journal of Computer Vision*, (7) 1, pp. 11-32, 1991). There is a continuum of possible representations depending on the degree of spatial distortion that can be accommodated. On one end of the continuum is pixel-by-pixel template matching. This approach is used for rigid objects (e.g., face detection). On the other end of the continuum are flexible models that decompose an object into its component parts and capture the possible spatial relationships between them. As one moves from the former end of the continuum to the latter end, the approaches become much more flexible in the types of distortions that they can handle. However, they also tend to require more high-level knowledge about the target object and become more susceptible to false alarms. An approach near the latter end of the spectrum is necessary for objects whose spatial arrangements can change significantly (e.g., human pedestrians). For our compound color object detection problem, an approach somewhere in the middle is required. By definition, the spatial layout of a compound color object is fixed, but distortions may still occur due to camera angle and projection of the object on a non-rigid surface, like flags and logos on fabric.

Object detection is a fundamental problem in computer vision and has received a large amount of attention in the literature. As mentioned above, there is a spectrum of different approaches to object recognition, depending upon the level of abstraction at which object matching is performed. Major relevant object detection work found in the literature is highlighted here. The work is listed in order of increasing levels of abstraction.

> Rowley et al. detect faces using template matching on the intensity plane of an image. Pre-processing is applied to input images to correct for lighting variations and to boost contrast. Image regions are classified as face or non-face using a neural network classifier applied directly on the luminance pixel values. The neural network was trained with approximately 10,000 ground-truth images.

Schneiderman and Kanade detect faces in images using joint histograms of wavelet features. Their statistical approach allows some robustness to variation in facial appearances, such as different angles of face orientation.

Oren et al. (M. Oren, C. Papageorgiou, P. Sinha, E. Osuna, T. Poggio. Pedestrian Detection Using Wavelet Templates. In *Proceedings of the IEEE Conference on Computer Vision and Pattern Recognition*, 1997) use wavelet features to detect pedestrians in images. The input image is scanned for pedestrians using windows of different sizes and classified using a Support Vector Machine.

Selinger and Nelson (A. Selinger, R. C. Nelson. Appearance-based Object Recognition Using Multiple Views. In *Proceedings of the IEEE Conference on Computer Vision and Pattern Recognition*, 2001) represent 3-D objects by several 2-D images taken from different angles. The 2-D images are further abstracted as groups of contour curves. Recognition is performed by exhaustive template matching of the curves.

Huttenlocher et al. (D. P. Huttenlocher, G. A. Klanderman, and W. J. Ricklidge. Comparing Images Using the Hausdorff Distance. In *IEEE Transactions on Pattern Analysis and Machine Intelligence*, (15) pp. 850-863, 1993) represent objects using edge pixel maps and compare images using the Hausdorff distance between the locations of edge pixels. The Hausdorff distance allows more tolerance to geometric distortion than simple pixel-by-pixel template matching.

Fan et al. (L. Fan, K.-K. Sung, T.-K. Ng. Pedestrian registration in static images with unconstrained background. In *Pattern Recognition*, 36 (2003), pp. 1019-1029, 2003) represent outlines of pedestrians using a series of feature points and line segments. A feature-based image warping technique is used to account for variability in pedestrian appearance.

Cootes et al. (T. F. Cootes, G. J. Edwards, and C. J. Taylor. Active appearance models. In *Proceedings of the European Conference on Computer Vision*, pp. 484-498, 1998) represent objects using active appearance models (AAMs) that model the shape and grayscale appearance of objects. The models allow detection of flexible objects, like faces.

Sprague and Luo detect people in images by grouping together segmented regions using characteristics like position, shape, size, color, and orientation according to a flexible model. A Bayesian network classifier is used.

Forsyth and Fleck use a similar approach to detecting horses in images. Their system segments an image into candidate horse regions using color and texture features and then assembles regions using a "body plan" to support the related geometric reasoning. Although powerful, these graphical model-based matching approaches require either a large amount of ground truth data to learn the allowable variability in an object's appearance, or require rules specified by the intuition of a human expert.

In U.S. Patent No. 6,477,272 entitled "Object recognition with co-occurrence histograms and false alarm probability analysis for choosing optimal object recognition process parameters," Krumm and Chang propose an object detection algorithm using color co-occurrence histograms, a feature that captures the colors within an object as well as some spatial layout information. They quantize multiple object models to a small number of colors using a k-means clustering algorithm and then quantize the test images using the same color clusters. They compute the color co-occurrence histogram of the model objects. The test image is scanned by computing the color co-occurrence histogram of large, overlapping regions which are compared to the model using histogram intersection. Object locations are refined by a hill-climbing search around regions exhibiting high similarity to the model during the rough scan. The disclosure focuses on detailed analysis for setting the parameters of the algorithm to minimize false alarms.

It must be noted that the method of Krumm and Chang was designed for images captured under very controlled conditions. Specifically, illumination conditions and camera settings need to be kept constant across all model and test images. The size and orientation of the objects also need to be the same across all model and test images. Such assumptions do not hold for unconstrained consumer images, where factors like illumination and object size can vary widely from image to image. In summary, it is clear that Chang and Krumm's approach would not generalize to unconstrained consumer images. The following shortcomings of their proposed algorithm are specifically identified:

It is not invariant to color shifts. It assumes controlled illumination conditions and is therefore unable to handle the color shifts typical across different consumer images.

It is not invariant to scaling. It assumes that target objects have a constant size with respect to the image dimensions.

It is not invariant to object orientation.

It assumes that the target object occurs exactly once in each test image. No facility is provided for processing images that contain zero or multiple target objects.

It relies on a hill-climbing strategy in which the object location is found by iteratively sliding the hypothesized object location towards the direction of best match. Such strategies are prone to falling into local maxima that are not globally optimal.

It uses a similarity metric that yields a high frequency of false alarms.

The computation demands of the algorithm are high.

Consequently, there is therefore a need for a compound color object detection method that is easily deployable for most compound color objects. Instead of requiring a large number of exemplars or human intuition, the algorithm should work well with a single or a small number of model images. The algorithm should be easily redeployable for other compound objects by simply changing the model image. In particular, a need exists for a technique of object detection that overcomes the above-described drawbacks.

SUMMARY OF THE INVENTION

The present invention is directed to overcoming one or more of the problems set forth above. Briefly summarized, according to one aspect of the present invention, a method of finding a color object in a digital image, comprises the following steps: (a) obtaining a search image that potentially includes the color object; (b) obtaining a model image including a model of the color object; (c) computing a Spatial Color Joint Probability Function (SCJPF) for the model image, wherein a model image SCJPF is a distribution of colors, as well as spatial relationships between such colors in the model image; (d) generating a plurality of search windows each comprising a portion of the search image, with each portion being within a region of the image having a minimum predefined number of the colors present in the object model image; (e) computing a SCJPF for each search window, wherein a search window SCJPF is a distribution of colors as well as spatial relationships between such colors in the search window (f) assessing a degree of similarity between the model image SCJPF and each of the search window SCJPFs; and (g) designating search windows associated with search window SCJPF having a degree of similarity to the model image SCJPF which exceeds a prescribed search threshold as potentially containing the object being sought.

In another aspect of the invention, color quantization is performed on both the model image and the search image, wherein the number of unique colors in the images is reduced to a set of predetermined perceptually related color names. In yet another aspect of the invention, the Spatial Color Joint Probability Function (SCJPF) is a distribution of colors at color edges as well as spatial relationships between such colors in the model and search images, wherein a color edge is defined as a pixel whose color is different from its neighboring pixels according to a predetermined threshold.

The present invention has the advantage of increasing the detection rate of objects and decreasing the detection rate of non-objects. In particular, the detection rate is increased over the prior art method by perceptual color quantization, ability to detect objects of different sizes, use of a new similarity assessment metric, and use of image edge analysis. The present invention also has the advantage of higher efficiency in the search process due to pre-screening.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
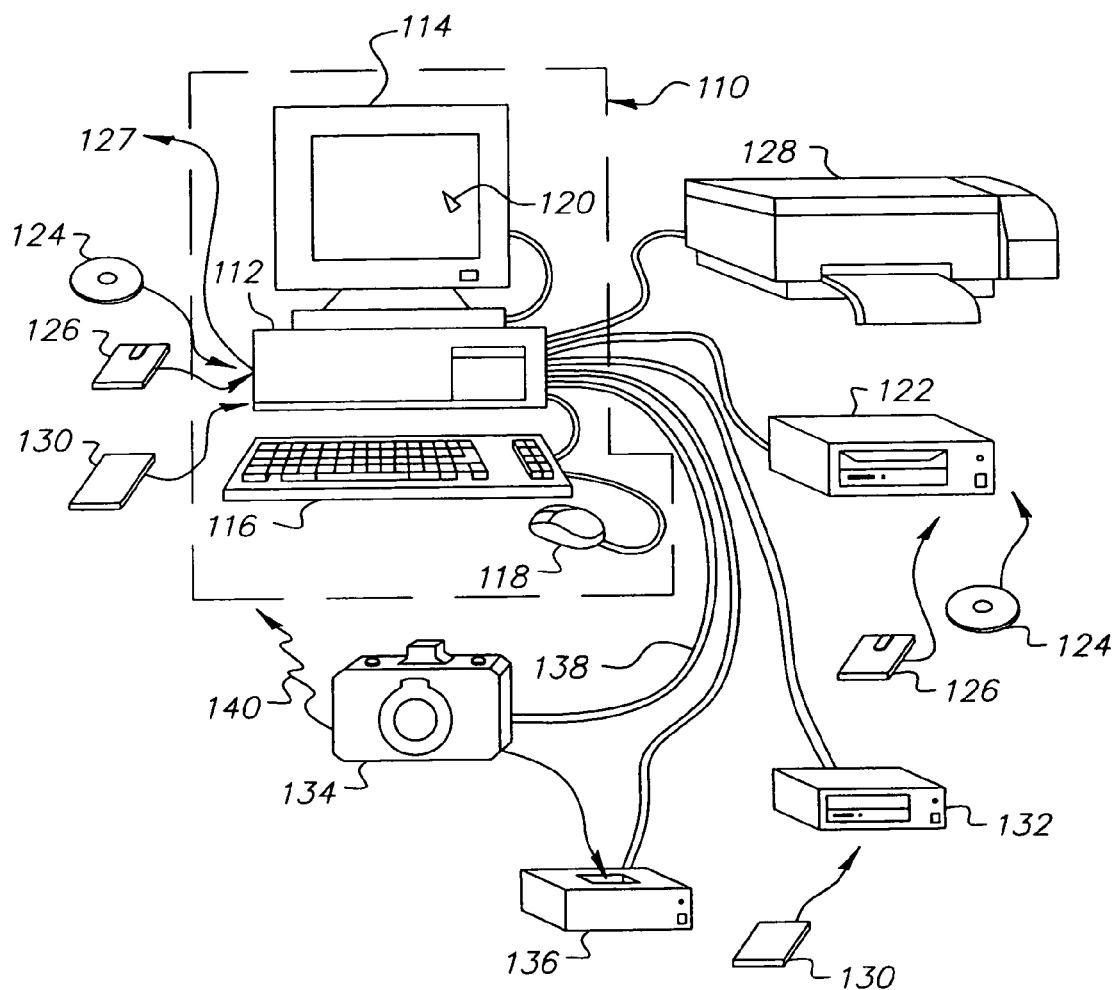
FIG. 1 is a pictorial diagram of a computer system for implementing the present invention.

Before describing the present invention, it facilitates understanding to note that the present invention is preferably utilized on any well-known computer system, such a personal computer. Referring to FIG. 1, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner (not shown). Images may also be input directly from the digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112. In accordance with the invention, the object detection algorithm disclosed in the preferred embodiment of the invention may be stored in any of the storage devices heretofore mentioned and applied to images for object detection and location of specific objects.

The object detection algorithm disclosed in the preferred embodiment of the present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better -or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cellphone that can be used as a processing unit, a display unit, or a unit to give processing instructions), and as a service offered via the World Wide Web.

In each case, the algorithm may stand alone or may be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm itself can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

Figure 2A:
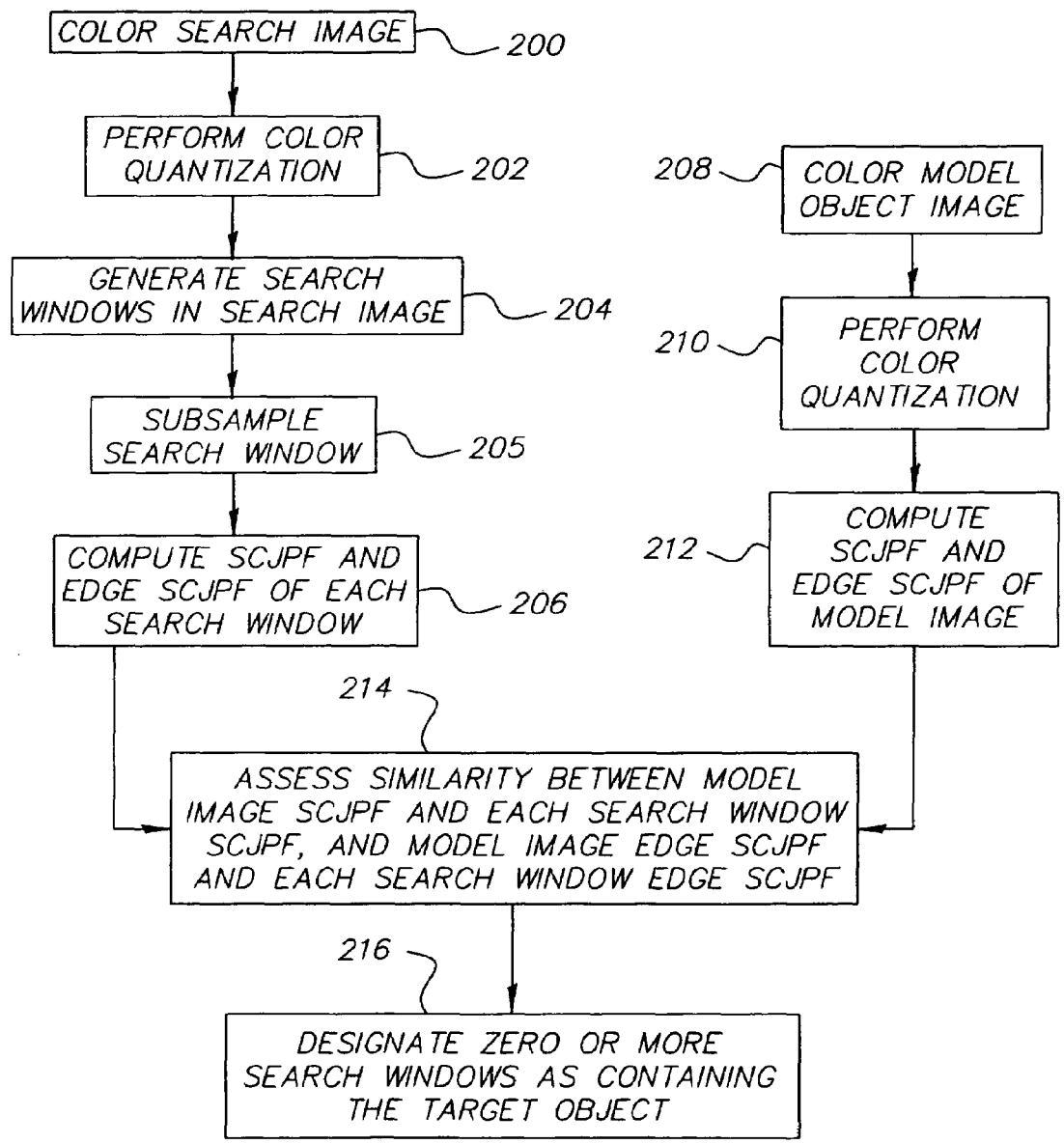
FIG. 2a is a block diagram of a preferred technique for detecting objects in an image according to the invention.

Referring now to FIG. 2a, there is illustrated a flowchart of the preferred embodiment of the algorithm employed according to the present invention. A description of the steps of the flowchart is given here, with more detail given in the ensuing description. The algorithm receives a digital image 208 containing a model of the object being sought in the detection process. A color quantization algorithm is performed 210 on the object model image 208 to produce a second image having fewer unique colors. Feature extraction is performed 212 on the quantized object model image to compute certain characteristics of the model image. The algorithm also receives a digital image 200 which includes, or potentially includes, one or more of the target objects. The same color quantization algorithm is performed 202 on the search image 200 to produce a second image having fewer unique colors. Based on results of image analysis, a plurality of possible search windows in the quantized search image is identified 204, indicating the possible locations and sizes of the object. The same feature extraction is performed 206 on each of the possible search windows to compute certain characteristics of each. The features of each search window are compared to the features of the object model image and a measure of similarity for each search window is assessed 214. Based on the comparison, zero or more of the search windows are designated 216 as containing the target object.

To simplify the ensuing description, the search image 200 is referred to as I and the model object image 208 as M. Note that an obvious extension to the present invention would be to search multiple images for the target object, by repeating the preferred technique multiple times for each image, either sequentially or in parallel. In a similar fashion, note that multiple objects could be sought in a search image by performing color quantization 210 and feature extraction 212 on each object model image and comparing the search windows with each of the plurality of model images.

The appearance of the colors of an object may differ significantly from image to image due to variations in illumination, perceptual color surround effects, noise caused by image compression, etc. Different instances of the same object may also have color variations even though the objects are perceptually considered the same. For example, American flags from different manufacturers may have different red dyes and hence slightly different stripe colors. In an object detection algorithm it is therefore desirable to quantize the color space of input images (typically having, for example, 256 levels or more for each of the red, green, and blue color channels) into a much smaller collection of colors. The quantization must be designed carefully to ensure that perceptually similar colors are mapped to the same quantized color value while dissimilar colors are mapped to different color values.

The color quantization algorithm 202, 210 of the present invention employs the standardized ISCC-NBS Color Names Dictionary (K. Kelly and D. Judd. *Color Universal Language and Dictionary of Names*. National Bureau of Standards Special Publication 440. Washington, DC: U.S. Government Printing Office, 1976, pp. 1-34). The ISCC-NBS system defines 267 standard color partitions, each with a standard color name and a standard representative color specification (called the centroid color). The ISCC-NBS color names are basic colors with a prefix of one or more adjectives, e.g. "Vivid Red," "Strong Reddish Brown," "Light Grayish Yellowish Brown," etc.

Figure 3:
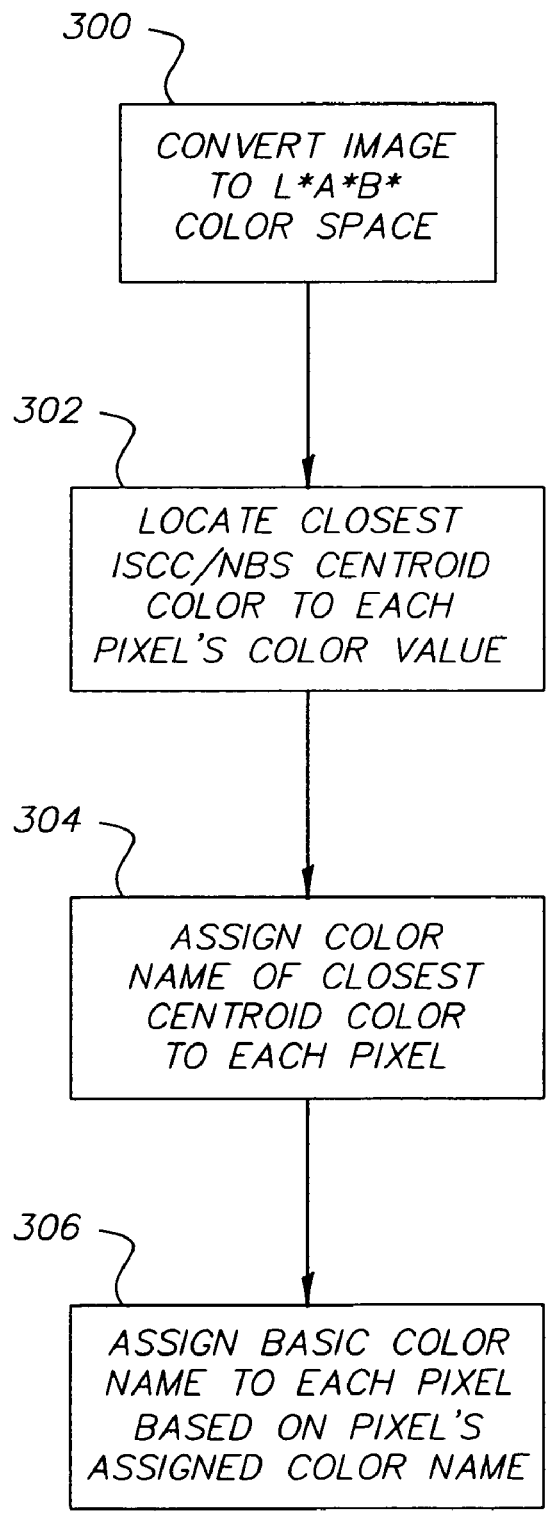
FIG. 3 is a detailed flowchart of the method for performing the color quantization as shown in FIGS. 2a, 2b, and 2c.

Referring now to FIG. 3, the pixels of the input image I are first properly converted 300 into the CIE L*a*b* color space (see, e.g., E. Giorgianni and T. Madden, *Digital Color Management: Encoding Solution, Reading, Mass.: Addison-Wesley*, 1997, pp. 439-445). Then, each of the pixels of I is assigned 302 to one of the 267 standard colors defined by the ISCC-NBS system. This is accomplished, for example, by comparing each pixel's L*a*b* color value to the centroid color value of each of the 267 partitions, and choosing the nearest according to some distance measure (for example, the three-dimensional Euclidean distance given by $\sqrt{(L_1-L_2)^2+(a_1-a_2)^2+(b_1-b_2)^2}$). Each pixel is assigned 304 the ISCC-NBS color name of its assigned centroid color. Finally, a lookup table is employed 306 to assign each pixel a quantized color value from a small set of basic or fundamental color names Qc based on its assigned color name. $Q_c$ could contain, for example, red, green, yellow, blue, orange, purple, brown, white, black, and gray. The look-up table can be constructed, for example, by mapping each ISCC-NBS color name to the name produced after all adjectives have been removed (e.g. "Vivid Red" to "Red," "Light Grayish Yellowish Brown" to "Brown," etc.). The resulting look-up table could be customized if necessary based on input from human observers or based on the specific needs of the object detection task at hand: for example, a human skin tone color can be added to the set of basic colors when the task involves images containing people.

Note that the mapping between ISCC-NBS color names and the basic colors 306 of $Q_c$ need not be one-to-one. In particular, the same ISCC-NBS color name may be mapped to multiple basic colors. This is useful, for example, when an ISCC-NBS centroid color is near the boundary of a basic color, or when it is necessary to account for multiple possible interpretations of a color by observers at different chromatic adaptations.

While the color quantization approach is conceptually split into four steps (300 through 306), note that in implementation the mapping from RGB color values to quantized color values may be done using a single step (e.g. using a single composite 3-D lookup table).

The present invention utilizes spatial-color joint probability functions (SCJPFs) during the model image feature extraction step 212, search window generation step 204, and search window feature extraction step 206. An SCJPF represents a distribution of colors as well as the spatial relationships between such colors in an image. This approach is superior to pixel-by-pixel template matching because it allows for some level of non-rigidity (i.e., distortion) but is simple enough that models can be built without large amounts of training data or handcrafting by a human expert. For example, the color co-occurrence histogram (CCH) used by Krumm and Chang in the aforementioned U.S. Pat. No. 6,477,272, and the color correlogram used by Huang et al. (J. Huang, S. Kumar, M. Mitra, W.-J. Zhu, R. Zabih) in "Image Indexing Using Color Correlograms" (*Proceedings of the IEEE Conference on Computer Vision and Pattern Recognition*, pp. 762-768, 1997), are two specific forms of SCJPF. As set forth in the Krum and Chang patent, a CCH is computed by generating counts of pairs of pixels whose pixels exhibit a prescribed pixel characteristic that fall within the same combination of a series of pixel characteristic ranges and which are separated by a distance falling within the same one of a series of distance ranges. The preferred embodiment of the present invention uses two specific SCJPFs: the color co-occurrence histogram (CCH) and the color edge co-occurrence histogram (CECH). Furthermore, the usage of the term "distribution" should be understood without limitation to be inclusive of other relationships. For instance, while a histogram involves "counts", an SCJPF can be derived through other than counting. For example, one can define an SCJPF for an extremely regular object, e.g., a checkerboard pattern, directly without "counting".

The color co-occurrence histogram (CCH) is a three-dimensional histogram that is indexed by color in two dimensions and spatial distance in the third. Each bin of the histogram records the frequency that pixels of two given colors occur at a given spatial separation. It can be defined more formally as follows. Suppose J is a region of image I which has been quantized into colors from the set $Q_c$, and I(p) represents the color of pixel p in the quantized I. Then the CCH operator is defined such that if $A = CCH\{J, I\}$, then A is a three-dimensional matrix such that $A(c_1, c_2, d) = \text{size}(\{(p_1,p_2)|p_1 \in J, p_2 \in I, c_1 = I(p_1), c_2 = I(p_2), d = q\text{dist}(p_1,p_2)\})$ for all $c_1, c_2 \in Q_c$ and non-negative integers $d \leq T_d$, where $T_d$ is a pre-determined constant (e.g. 16 pixels), size counts the number of elements of a set, and qdist is a quantized distance function. $T_d$ specifies the size of the neighborhood that is considered during the CCH computation. Any function that returns some measure of the distance between two pixels quantized to a non-negative integer may be used for qdist. In the preferred technique, a quantized Euclidean distance function is used:

$q\text{dist}((x_1, y_1), (x_2, y_2)) = \lfloor \sqrt{(x_1-x_2)^2+(y_1-y_2)^2} \rfloor$ Another possibility would be to use the city block distance, i.e.:

$q\text{dist}((x_1, y_1), (x_2, y_2)) = \lfloor |x_1-x_2|+|y_1-y_2| \rfloor$

An advantage of using the latter distance metric is that more efficient computation of the CCH is possible (J. Huang, S. Kumar, M. Mitra, W.-J. Zhu, R. Zabih. Image Indexing Using Color Correlograms. In *Proceedings of the IEEE Conference on Computer Vision and Pattern Recognition*, pp. 762-768, 1997). However a potential disadvantage is that the latter distance measure is not invariant to rotation and hence is not as attractive for an object detection system.

The CCH suffers from a fundamental problem: solid regions of color tend to contribute a disproportionate amount of energy to the histogram and overwhelm CCH comparison metrics. This causes the CCH to show similarity between two image regions having similar solid color regions but obviously different spatial relationships between the regions. In a preferred embodiment of the present invention, this problem is solved by using a new construct called the color edge co-occurrence histogram (CECH). This histogram captures the distribution of separation between those pixels lying along color transitions or color edges, where a color edge is defined as a boundary between regions of dissimilar colors. Since color transitions are perceptually very important for discerning the internal structure of a compound color object, the CECH betters captures the unique spatial signature of an image region containing the object.

The CECH is defined as follows for a region J of an image I:

if $A = CECH\{J, I\}$ then $A(c_1, c_2, d) = \text{size}(\{(p_1,p_2)|p_1 \in \text{edges}(J), p_2 \in \text{edges}(I), c_1 = I(p_1), c_2 = I(p_2), d = q\text{dist}(p_1,p_2)\})$ where edges(I) is the set of pixels in I that are judged to be edge pixels, for example, those pixels having either at least one 8-neighbor of a different color or lying on the image boundary of I.

In practice, the CECH of a typical region is much faster to compute than the CCH of the same region, because the pixels that do not exhibit the edge characteristic can be immediately ignored and excluded from computation. For example, for a typical image of an object, less than one-tenth of pixels are edge pixels, and hence the computation of the CECH takes a fraction of the time required by the CCH.

Note that the CCH and CECH may be extended to operate on images that have multiple possible (basic) colors per pixel, e.g., a pink colored pixel can be considered both "red" and "white" at the same time, as is the case with the output of a color quantization algorithm that produces multiple possible quantized colors per input color.

Figure 4:
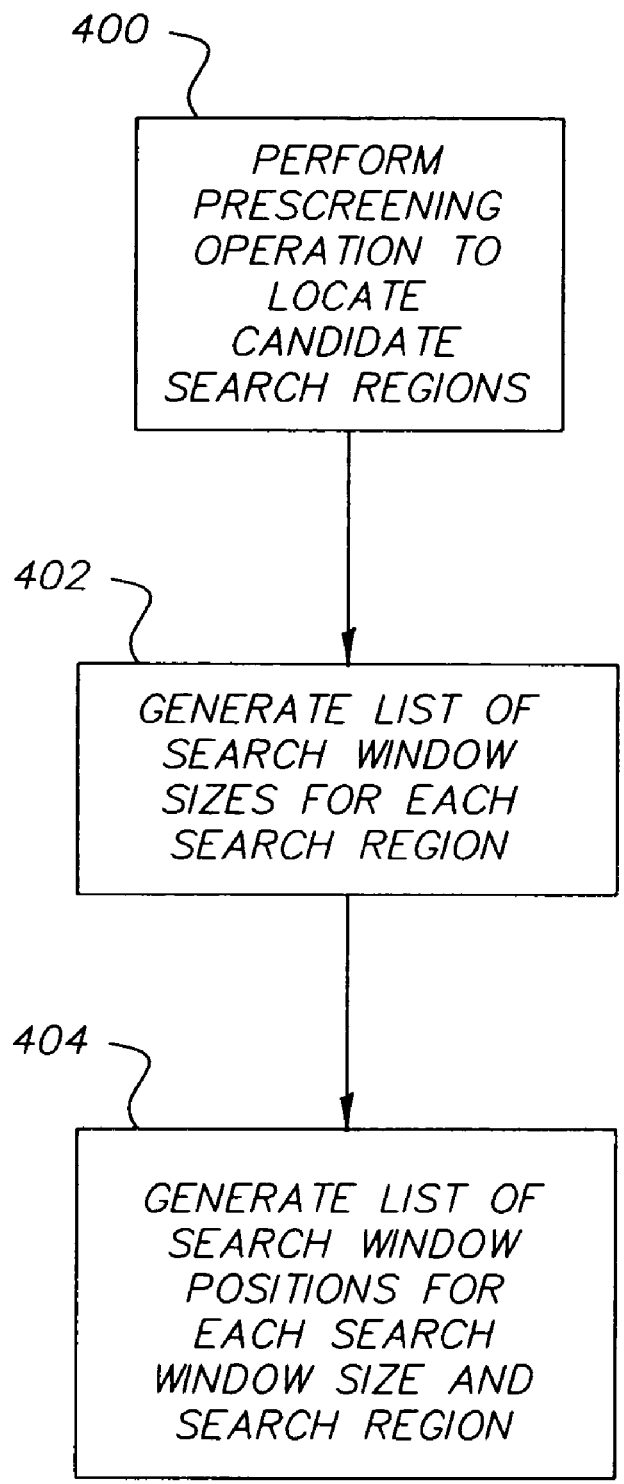
FIG. 4 is a detailed flowchart of the method for performing the search window generation as shown in FIGS. 2a, 2b, and 2c.

Referring now to FIG. 4, there is shown a flowchart of the process of generating candidate search windows 204. This involves the steps of identifying candidate search regions 400 within I that may contain the object, generating a list of possible object sizes 402 within I, and generating a list possible object locations 404 of each possible size within I.

In the remainder of the description, the result of the search image color quantization step 202 is referred to as $I_Q$ and the result of the object model image color quantization step. 210 is referred to as $M_Q$.

Figure 5A:
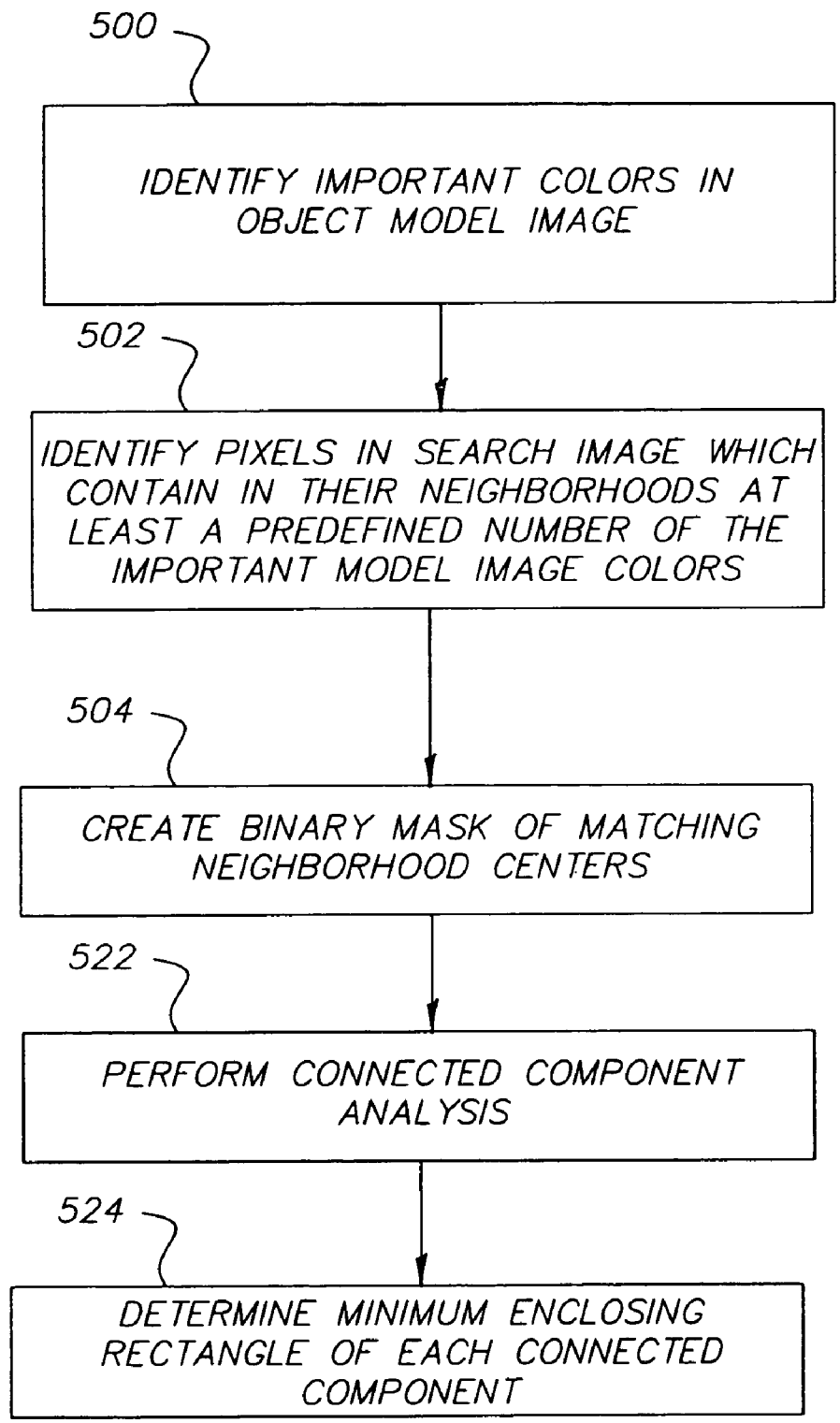
FIG. 5a is a detailed flowchart of the method for performing the prescreening step shown in FIG. 4.

FIG. 5a shows a diagram of the preferred method for performing a prescreening of the image I to identify possible regions 400 that may contain the target object. The purpose of including the prescreening step 400 is to quickly eliminate regions of the image that obviously do not contain the target object and do not warrant further processing. The prescreening step can significantly decrease the running time of the algorithm by avoiding unnecessary processing. In addition, the pre-screening step also provides a range of potential sizes of the target object in the image, as will be described in detail later.

First, the present invention identifies the important colors of the model image $M_Q$ 500 by finding the set $S_1$ of colors occupying a significant percentage (e.g. more than 10%) of the area of $M_Q$. Then a window 502 of predetermined size is passed over the quantized search image $I_Q$. The window is of size, for example, c×c where c is one-tenth the length of the longer dimension of I. For each window centered at a given pixel location (x,y), we identify the set $S_{(x,y)}$ of the colors occupying a significant percentage (e.g. more than 10%) of the window area. A binary mask image $P_i$ is then created 504 that identifies pixels corresponding to possible object locations as 1 and background regions as 0:

$$P_1(x, y) = \begin{cases} 1 & \text{if } \frac{size(S_{(x,y)} \cap S_1)}{size(S_1)} \geq T_A \\ 0 & \text{otherwise} \end{cases}$$

where $T_A$ is some constant equal to, for example, 0.5. Connected component analysis (R. C. Gonzalez and R. E. Woods, *Digital Image Processing*, Reading, MA: Addison Wesley, 1993, pp. 40-43) is performed 522 on $P_1$ to locate contiguous regions of pixels. The minimum-size enclosing rectangles of all connected components are determined 524. These rectangles make up the set R of search regions that may contain the target object. Only these regions are considered further in the ensuing steps of the algorithm.

Figure 5B:
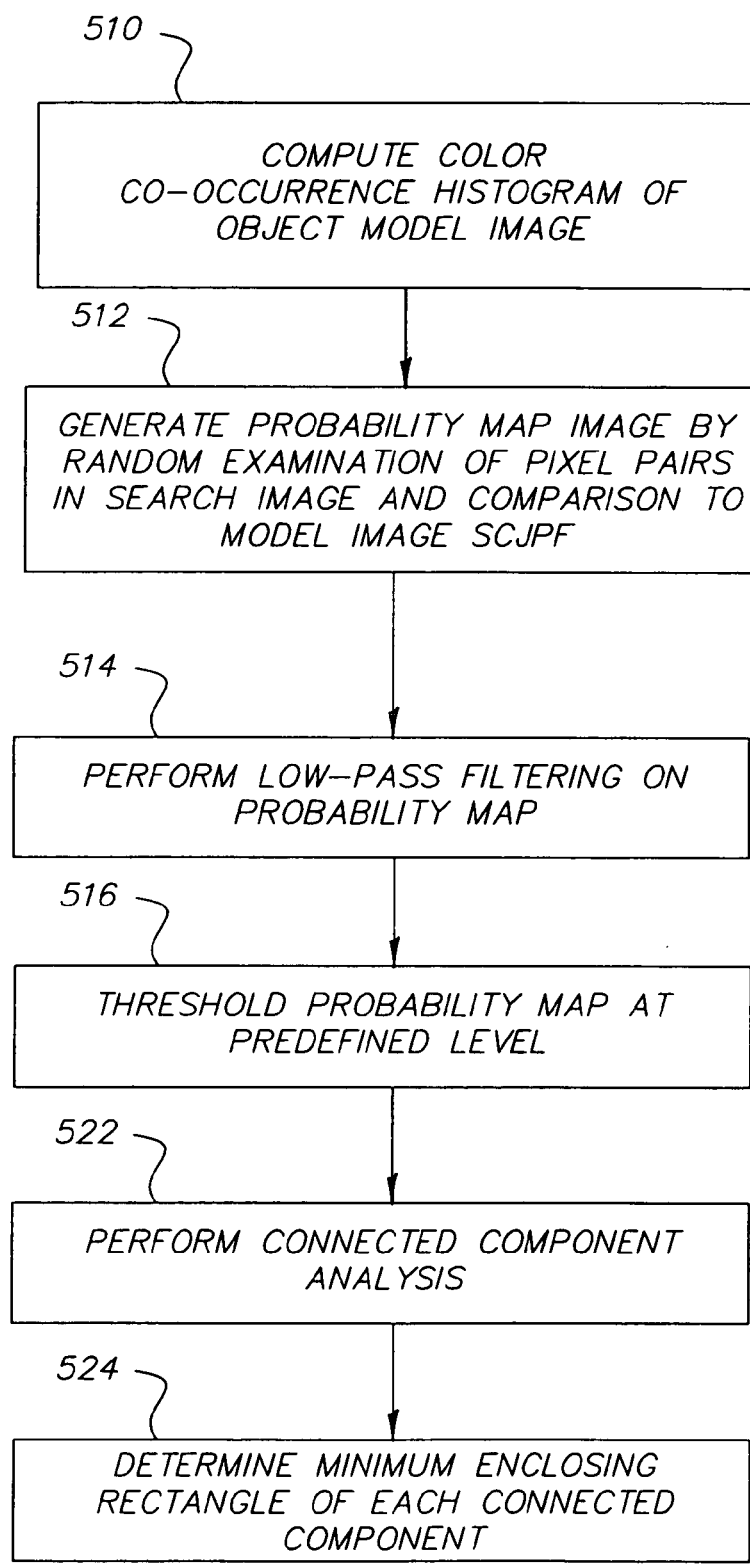
FIG. 5b is a detailed flowchart of an alternative method for performing the prescreening step shown in FIG. 4.
Figure 8:
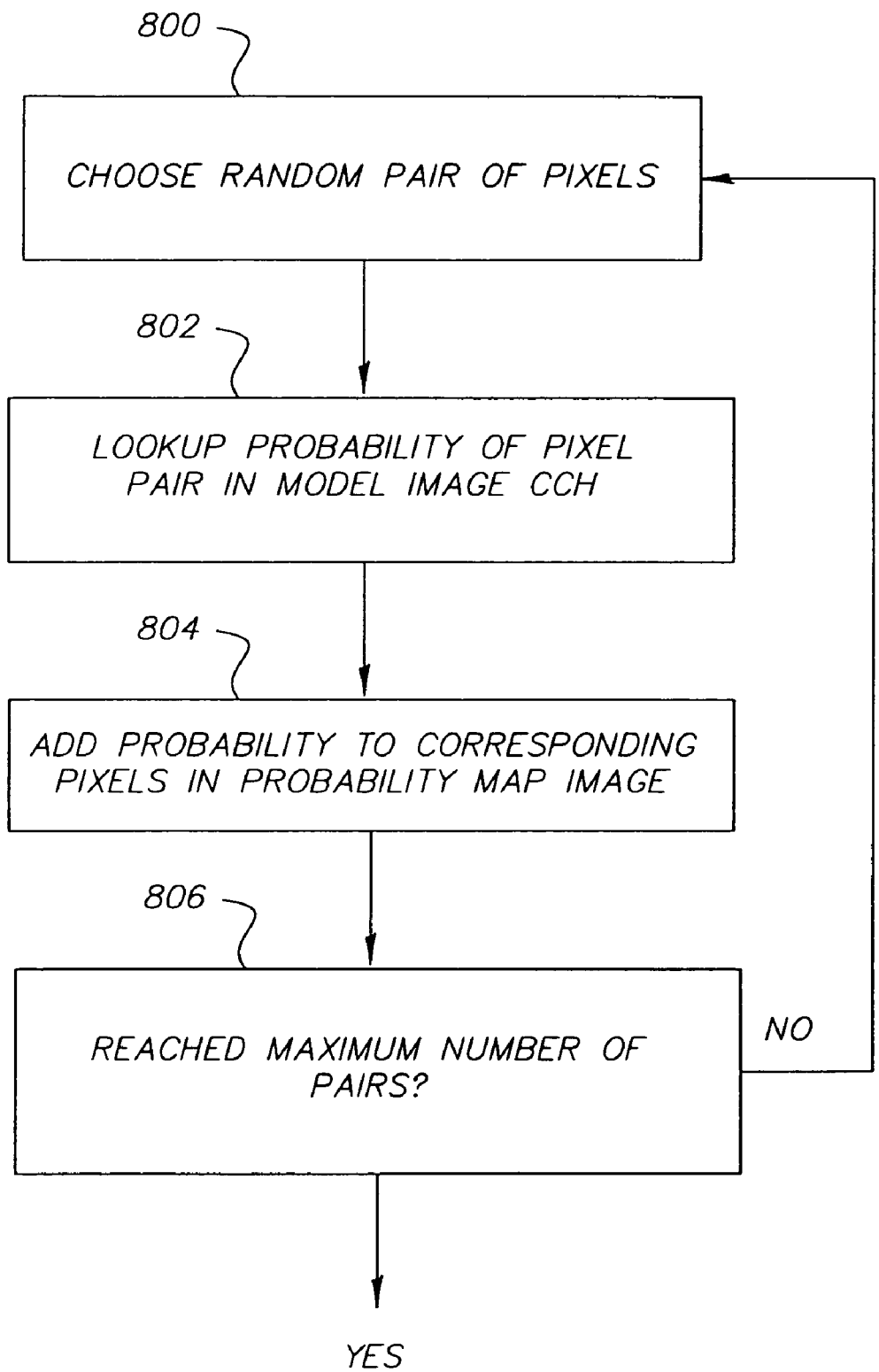
FIG. 8 is a detailed flowchart of the probability map generation step shown in FIG. 5.

An alternative pre-screening method is presented in FIG. 5b. The mask image $P_2$ can be computed to check if the local spatial color arrangements are consistent with those in the target object. First, the color co-occurrence histogram (CCH) of the quantized object model image $M_Q$ is computed 510. The process of computing $P_2$ 512 is shown in further detail in FIG. 8. $P_2$ is computed by randomly choosing pairs of pixels 800 from $I_Q$ no further than $T_d$ pixels apart. For each pair $(p_1, p_2)$ at distance d, the corresponding entry $(I_Q(p_1), I_Q(p_2), d)$ in the model CCH is checked and the probability p of occurrence is computed 802 by normalizing by the total number of entries in the model image CCH. This probability is added to the two pixels in $P_2$ 804, i.e. add p to $P_2(p_1)$ and $P_2(p_2)$. This process is repeated many times 806 (e.g. 10 mn times, where m×n are the dimensions of I). The resulting image $P_2$ is akin to a probability map, where the value at each pixel location represents the probability of that pixel being located in the target object. Because the probability map is produced by random sampling of the input image, the probability map may vary from run to run. To minimize such variation, a low-pass filter (for example, a mean filter of size 21×21) is applied 514 to $P_2$. $P_2$ is then thresholded 516 (e.g. at a fixed threshold of 0.1) so that pixels having values above the threshold are marked as 1 and other pixels are marked as 0. Connected component analysis is then performed 522 and minimum-size enclosing rectangles are found 524 to generate the set R of search regions.

Figure 9:
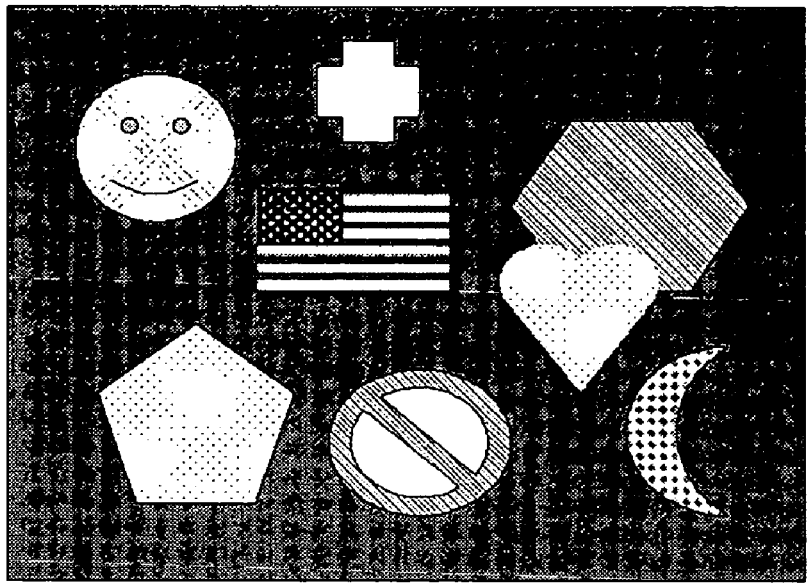
FIGS. 9a, 9b, 9c and 9d are sample results of the object prescreening step shown in FIG. 4.
Figure 9:
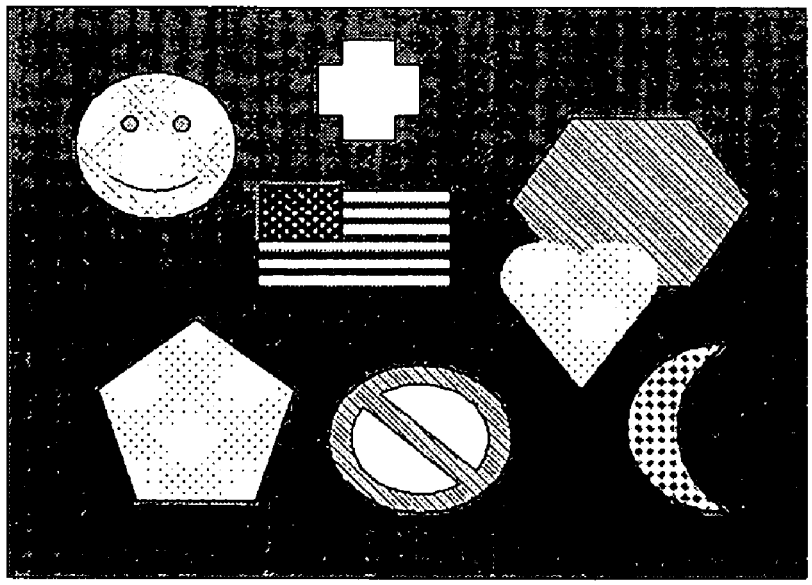
Figure 9:
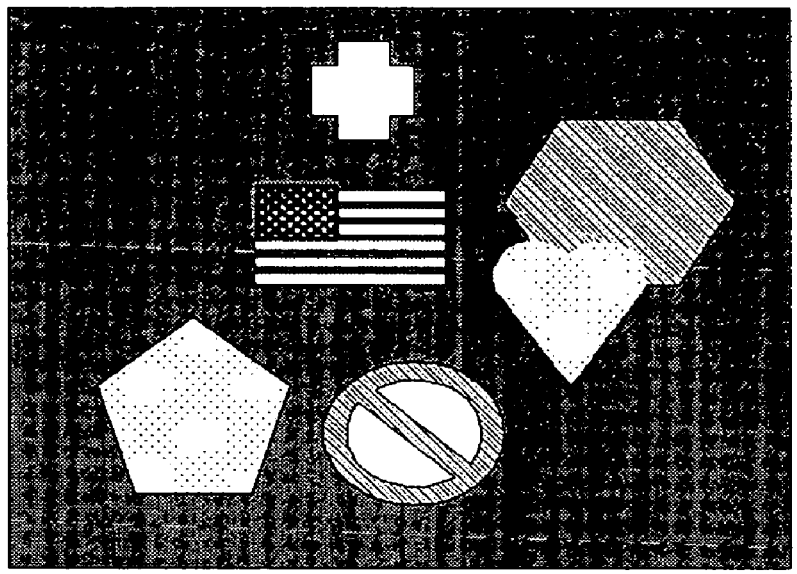
Figure 9:
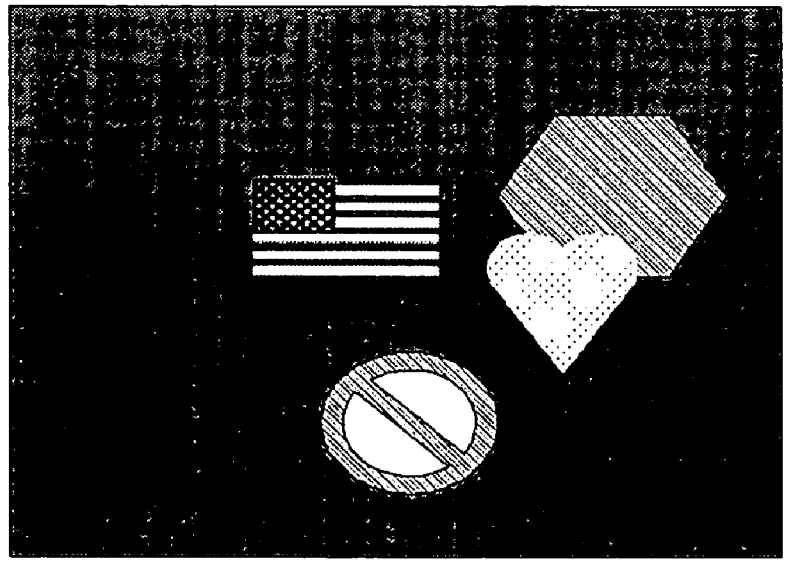
Figure 10:
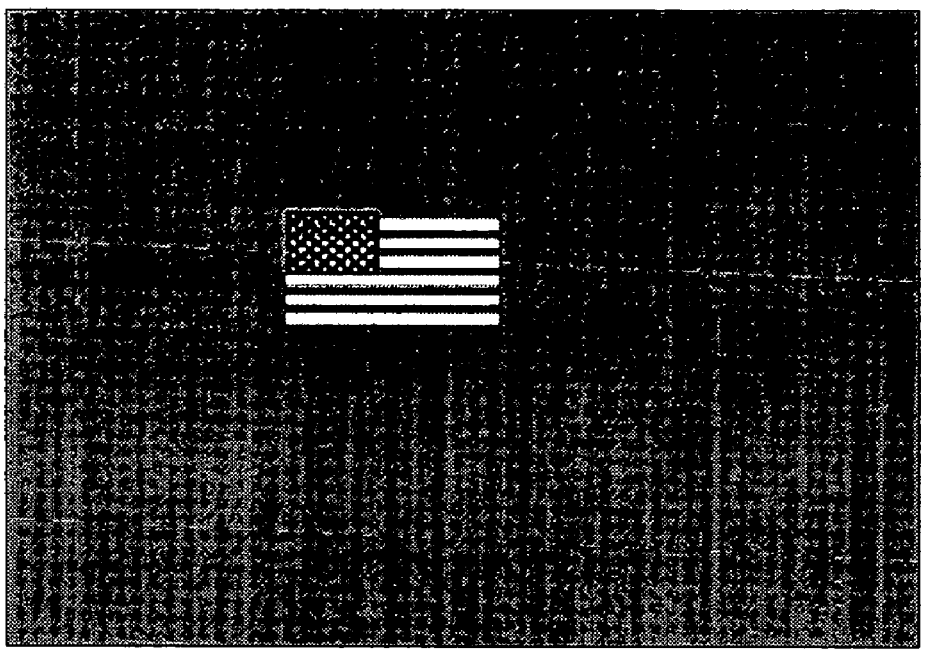
FIG. 10 is sample result of the object detection algorithm.

An illustrative example of the prescreening process is shown in FIG. 9 with an American flag as the model image and the image in FIG. 9(a) as the search image. The figure shows the result of the color quantization procedure 202 in FIG. 9(b), the result of the important color prescreening step 514 in FIG. 9(c), and the result of the alternative prescreening step 516 in FIG. 9(d).

Referring back to FIG. 4, after the prescreening step 400 has determined the set R of candidate search regions, a list of possible search window sizes is generated 402 for each search region. For each search region $R_i \in R$, the largest scaling of the model M that fits inside $R_i$ while preserving its aspect ratio is determined. This maximum scale factor $\gamma_H$ can be computed by:

$$\gamma_h = \min\left(\frac{m_i}{m_m}, \frac{n_i}{n_m}\right)$$

where $m_i \times n_i$ are the dimensions of $R_i$ and $m_m \times n_m$ are dimensions of M. The dimensions of the largest possible object within $R_i$ are thus $\gamma_H m_m \times \gamma_H n_m$. It is assumed that $m_m \times n_m$ is the smallest size that the object will likely have in the search image I. The list of possible search window sizes $\{\gamma_o, \gamma_1, \gamma_2, \ldots \gamma_n\}$ is generated 402 by selecting several scale factors between 1.0 and $\gamma_H$, for example:

$\gamma_0=1.0, \gamma_{j+1}=\alpha\gamma_j \forall j>0$ such that $\gamma_j \leq \gamma_H$ where α is a constant. Note that an obvious modification to the present invention would be to substitute a different method for choosing the set of scale factors.

For each scaling factor $\gamma_j$, a list of possible object locations within the candidate search region $R_i$ is generated 404. This is accomplished, for example, by listing all unique possible locations that a window of the size $\gamma_j m_m \times \gamma_j n_m$ could fit within the boundaries of the candidate search region, quantized along some grid. In other words, the set of coordinates corresponding to the upper-left corner of the search window within $R_i$ at scaling factor $\gamma_j$ is:

$$P_{i,j} = \left\{ (a\Delta x, b\Delta y) \mid a, b \in Z^*, a \leq \frac{m_i - m_m}{\Delta x}, b \leq \frac{n_i - n_m}{\Delta y} \right\}$$

where $\Delta x$ and $\Delta y$ are constants (e.g. equal to 10 pixels, or some fraction of the image dimensions) and $Z^*$ is the set of non-negative integers.

Referring once again to FIG. 2a, the dimensions of the search windows from the search window generation step 204 are normalized 205 by producing a scaled copy of the search window having the same dimensions as the model image. The normalization step 205 is implemented, for example, by a subsampling algorithm such as the well-known bi-linear interpolation. A spatial-color joint probability functions (SCJPF) and an edge SCJPF are next computed 206 for each of the sub-sampled search windows. In the preferred embodiment of the present invention, the color edge co-occurrence histogram (CECH) is used for the edge SCJPF and the color histogram (CH) is used for the SCJPF. In the preferred embodiment, the CECH and CH are also computed for the object model image in the object model feature extraction step 212.

Figure 6:
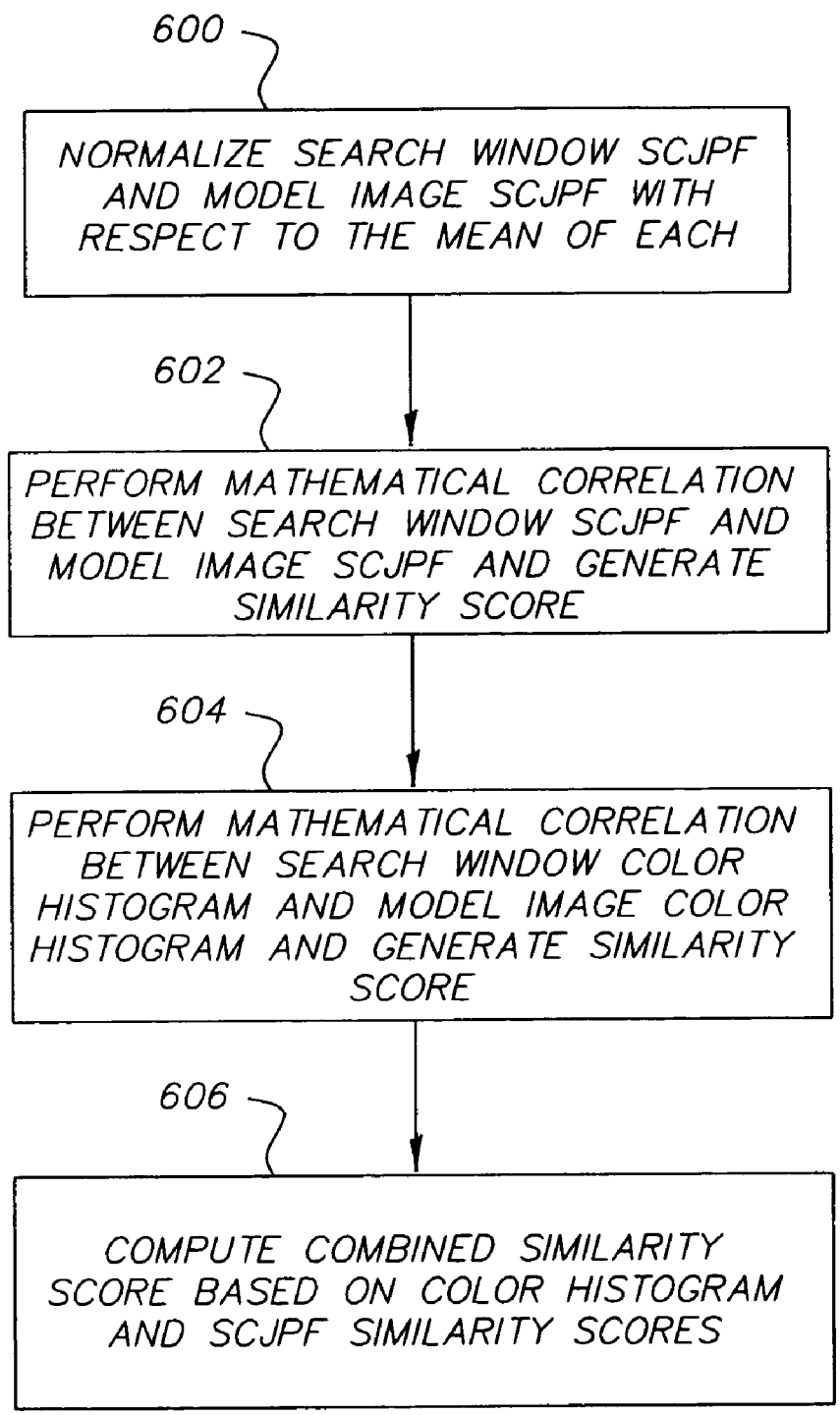
FIG. 6 is a detailed flowchart of the method for performing the similarity assessment step shown in FIGS. 2a, 2b, and 2c.

The next step 214 is to assess the similarities of the SCJPF and edge SCJPF of each of the search windows to the SCJPF and edge SCJPF of the model image. FIG. 6 illustrates the preferred technique for performing this assessment. For clarity, suppose the similarity between any image region $I_r$ and a model M is being assessed. First the mean bin height of the CECH of $I_r$ is calculated and subtracted 600 from each of its bins. The mean of the CECH of M is also calculated and subtracted 600 from each of its bins. Suppose the resulting normalized CECHs are called $C_r$ and $C_m$, respectively. In the preferred technique, least-squares linear regression (G. Box, W. Hunter and J. Hunter. *Statistics for Experimenters*. New York: John Wiley & Sons, 1978, pp. 453-462) is employed 602 to quantify the relationship between $C_m$ and $C_r$ by computing the following values of cc and b:

$$b(C_m, C_r) = \frac{\sum C_m(c_1, c_2, d) \cdot C_r(c_1, c_2, d)}{\sum C_m(c_1, c_2, d) \cdot C_m(c_1, c_2, d)}$$

$$cc(C_m, C_r) = \frac{\left(\sum C_m(c_1, c_2, d) \cdot C_r(c_1, c_2, d)\right)^2}{\sum C_m(c_1, c_2, d) \cdot C_m(c_1, c_2, d) \cdot \sum C_r(c_1, c_2, d) \cdot C_r(c_1, c_2, d)}$$

A high-quality match between $C_m$ and $C_r$ causes a high (close to 1.0) correlation coefficient cc, indicating that the height of the histogram bins in each CECH are similar in proportion, and a value of b close to 1.0, indicating that the size of $I_r$ is close to the size of the target object. A similarity measure $D_e$ is computed 604 as a combination of these two criteria:

$$D_e(C_m, C_r) = k_1 cc(C_m, C_r) + \max(0, (1-k_1)(1-|\log_2 b(C_m, C_r)|))$$

where $0 < k_1 < 1.0$ is a constant (e.g. $k_1 = 0.9$).

A similarity measure between the color histograms of M and $I_r$ is also computed 604. This is necessary to test whether M and $I_r$ contain the same mixture of colors. Suppose the color histograms of M and $I_r$ are called $CH_m$ and $CH_r$, respectively. In the preferred embodiment of the present invention, the color-based distance $D_c$ is computed 604 as follows:

$$b(CH_m, CH_r) = \frac{\sum CH_m(c_1) \cdot CH_r(c_1)}{\sum CH_m(c_1) \cdot CH_m(c_1)}$$

$$cc(CH_m, CH_r) = \frac{\left(\sum CH_m(c_1) \cdot CH_r(c_1)\right)^2}{\sum CH_m(c_1) \cdot CH_m(c_1) \cdot \sum CH_r(c_1) \cdot CH_r(c_1)}$$

$$D_c(CH_m, CH_r) = k_2 cc(CH_m, CH_r) + \max(0, (1-k_2)(1-|\log_2 b(CH_m, CH_r)|))$$

where $0 < k_2 < 1.0$ is a constant (e.g. $k_2 = 0.9$). An overall similarity assessment score between M and $I_r$ is then computed 606 using the equation:

$$D(M, I_r) = k_3 D_e(CECH\{M\}, CECH\{I_r\}) + (1-k_3) D_c(CH\{M\}, CH\{I_r\})$$

where $0 < k_3 < 1.0$ is a constant (e.g. $k_3 = 0.5$).

To carry out the step of assessing the similarity between the model image and each search window 214, the process of FIG. 6 is performed on each search window, i.e., $D(M, I_r)$ is computed for all search windows $I_r$ that were identified during the search window generation step 204.

Figure 7:
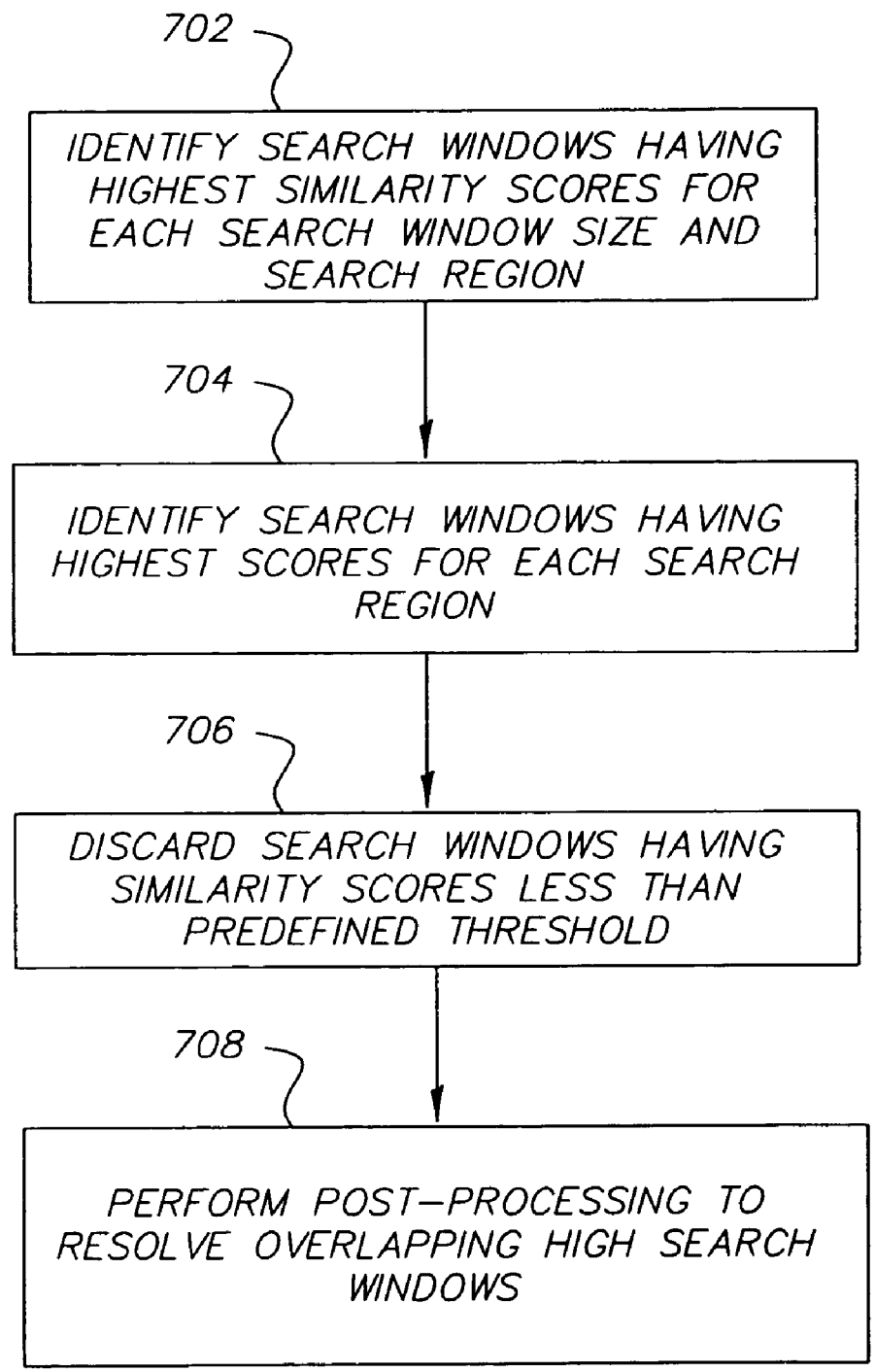
FIG. 7 is a detailed flowchart of the search window designation step shown in FIGS. 2a, 2b, and 2c.

Once the similarity of each search window to the model image has been assessed 214, the similarity assessment scores are reviewed 216 for possible designation as containing the target object. The sub-steps of search window designation 216 are shown in FIG. 7. The similarity scores are examined to identify 702 the search window having the highest similarity scores for each combination of search window size and search region. The best search window for each search region $R_i$ is identified 704 by selecting the search window having the largest similarity score among the highest scores identified at each size 702. The scores of the selected search windows of all sizes are then compared to a pre-determined score threshold 706 and are designated as containing the target object if their scores are above the threshold. The threshold may be a constant (e.g. 0.6) or a value determined by analysis of the characteristics of the model and/or search images.

We note that the algorithm can be used to very efficiently search for multiple compound color objects at once. Once the CCH has been computed, the computation of the similarity metric D is quite fast. It is therefore possible to search an image and look for multiple objects at once, simply by comparing to multiple models.

If the model M is circular, rotation invariant searching is automatically achieved because of the internal rotation invariance of the CECH. Similarly, if M is a square or rectangle with aspect ratio close to 1.0, rotation invariance has practically been achieved. In other cases, the search window generation 204 step must also generate search windows of different orientations. In most cases, only two model orientations (horizontal and vertical) need to be considered, even when the target objects are aligned at other (non-orthogonal) orientations because CCH is fairly forgiving.

Figure 2B:
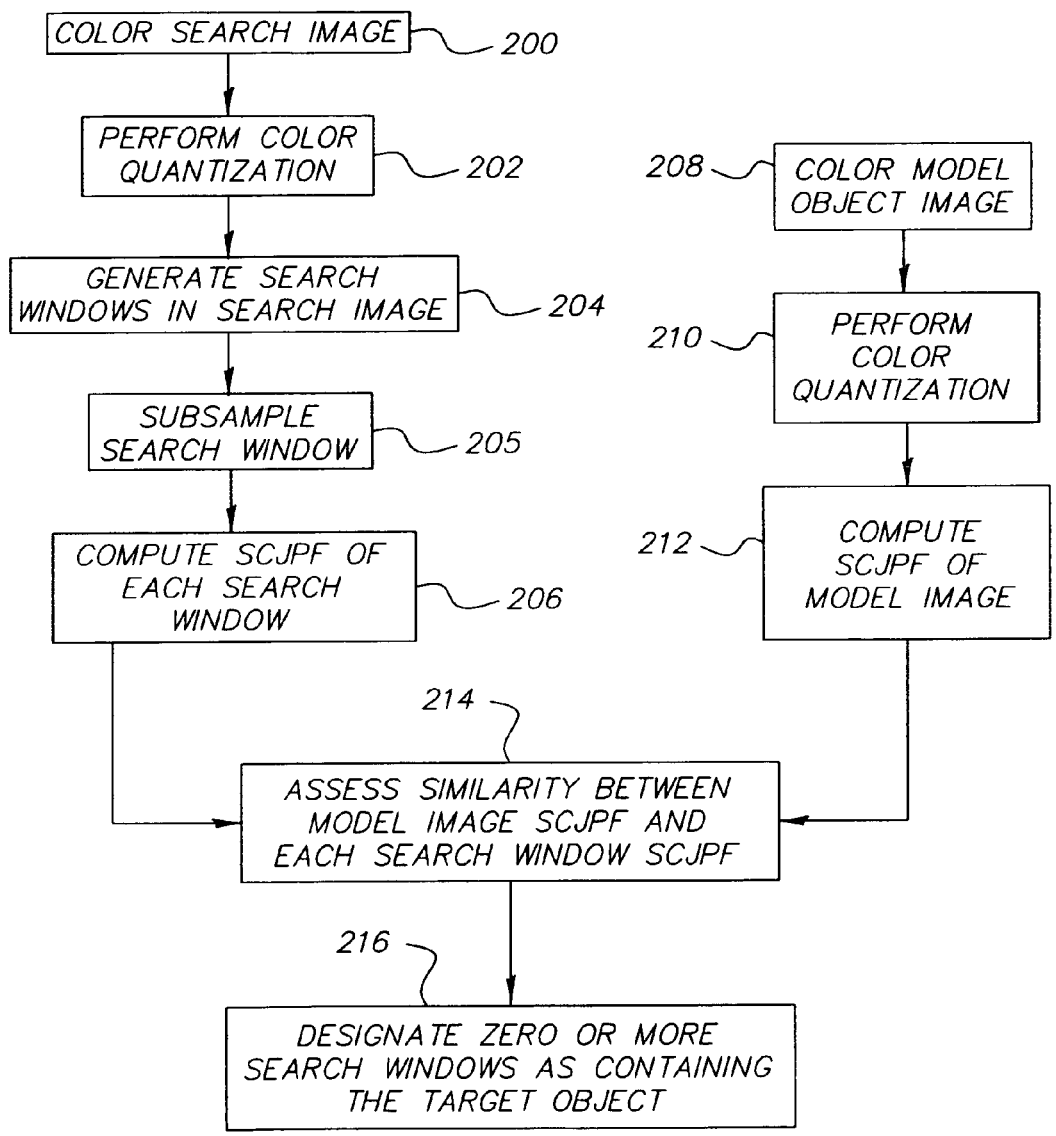
FIG. 2b is a block diagram of an alternative technique for detecting objects in an image according to the invention.

The block diagram of an alternative embodiment of the present invention is shown in FIG. 2b. In this embodiment, the object model image feature extraction step 212 consists of computing a SCJPF (for example, the CCH) of the object model image, and search window feature extraction step 206 consists of computing a SCJPF of each of the search windows identified during the search window generation step 204. The feature comparison step 214 consists of assessing the similarity between the SCJPF of each search window and the SCJPF of the object model image.

Figure 2C:
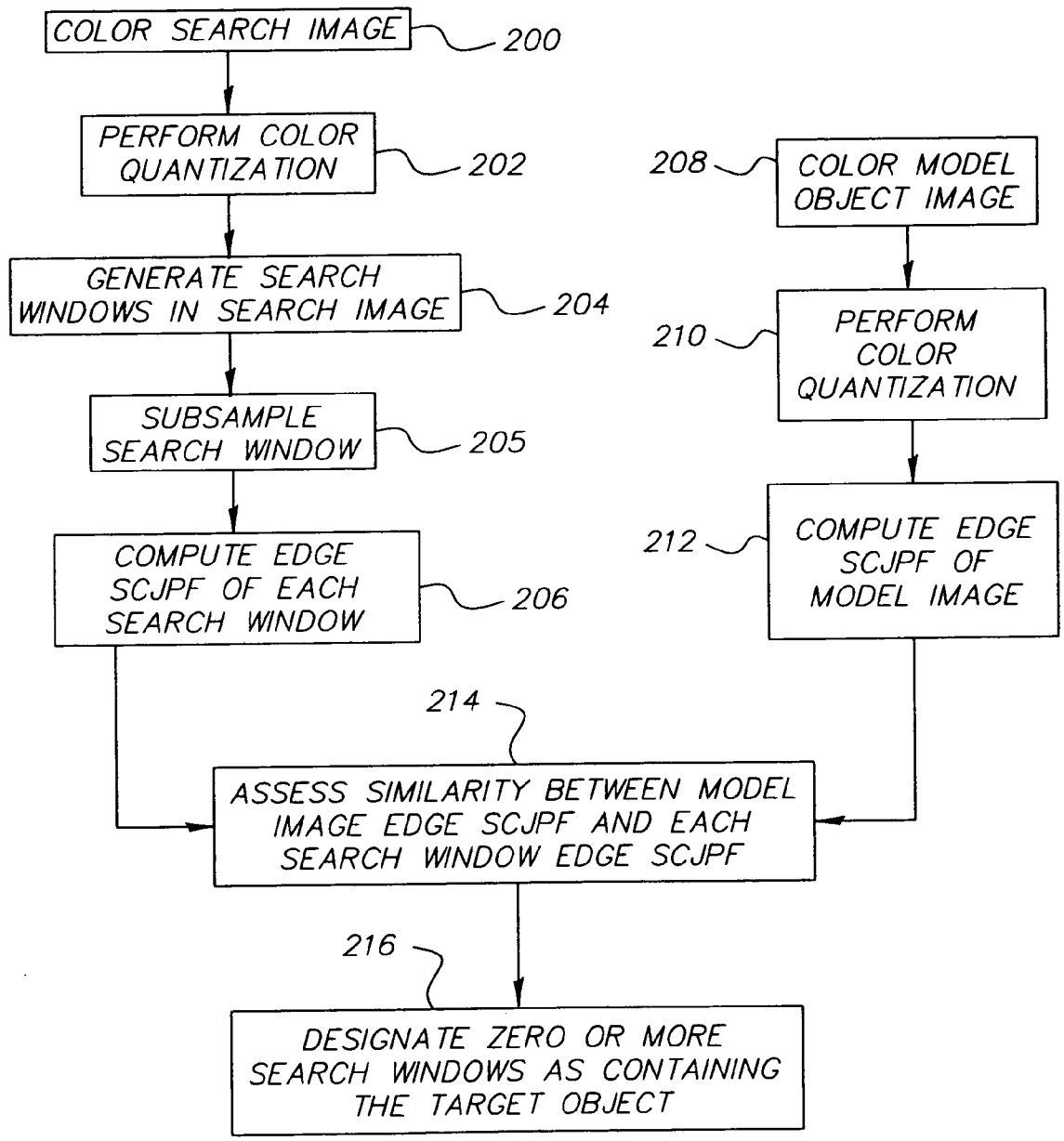
FIG. 2c is a block diagram of an alternative technique for detecting objects in an image according to the invention.

The block diagram of a third alternative embodiment of the present invention is shown in FIG. 2c. In this embodiment, the object model image feature extraction step 212 consists of computing an edge SCJPF (for example, the CECH) of the object model image, and search window feature extraction step 206 consists of computing an edge SCJPF of each of the search windows identified during the search window generation step 204. The feature comparison step 214 consists of assessing the similarity between the edge SCJPF of each search window and the edge SCJPF of the object model image.

There are several techniques that can be employed to efficiently perform the computations necessary in a computer program that implements the present invention. First, note that the CECH is additive in that the CECH of a region is equal to the bin-by-bin sum of the CECHs of its sub-regions. That is, for three image regions A, B, and C in image I:

if $A \cup B = C$ and $A \cap B = 0$, then $CCH\{A,I\} + CCH\{B,I\} = CCH\{C,I\}$.

Figure 11:
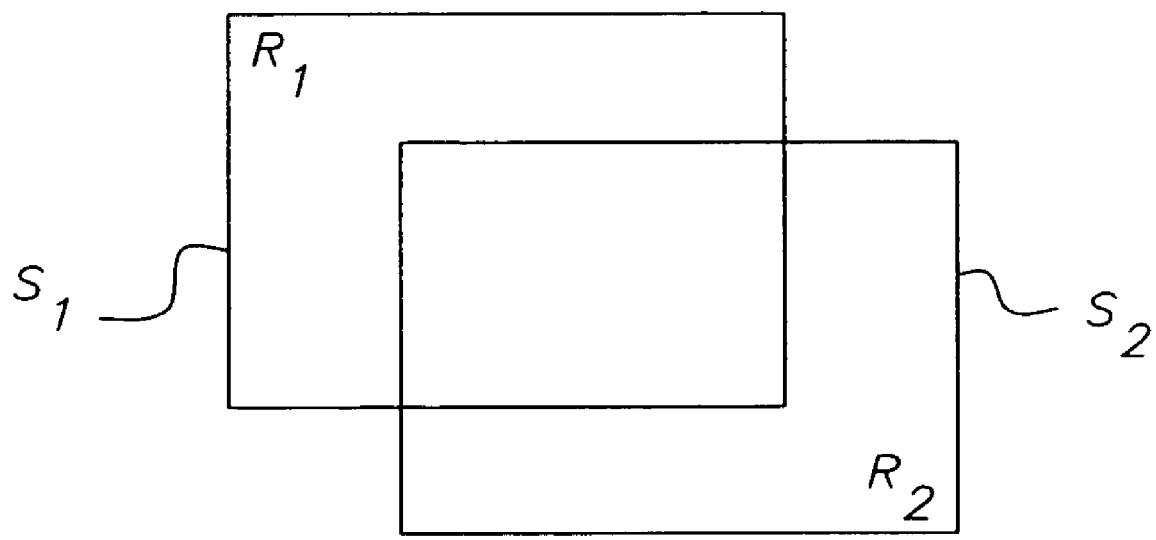
FIG. 11 is an illustration of an efficient method to implement the feature extraction step shown in FIGS. 2a, 2b, and 2c.

Typically, many of the search windows identified by the search window generation step 204 overlap one another. In the preferred embodiment of the present invention, the search window CECH computation step 206 maintains a record of the CECHs computed for some search windows. When computation of the CECH of a search window $S_1$ is required, the CECH computation step 206 first checks if the CECH of an overlapping search window of the same size has already been computed. If not, the CECH of $S_1$ is computed as usual. However, if the CECH of some overlapping search window $S_2$ has already been computed, as illustrated in FIG. 11, then the CECH of $S_1$ is computed by computing the CECH of the part of $S_2$ that does not overlap with $S_1$ (region $R_2$ in FIG. 11), subtracting it from the CECH of $S_2$, and adding to the result the CECH of the part of $S_1$ that does not overlap with $S_2$ (region $R_2$ in FIG. 11). In other words:

$CECH\{S_1, I\} = CECH\{S_2, I\} - CECH\{R_2, I\} + CECH\{R_1, I\}$

The subject matter of the present invention relates to digital image understanding technology, which is understood to mean technology that digitally process a digital image to recognize and thereby assign useful meaning to human understandable objects, attributes or conditions and then to utilize the results obtained in the further processing of the digital image.

The invention has been described in detail with particular reference to certain preferred embodiments thereof, but it will be understood that variations and modifications can be effected within the spirit and scope of the invention.

PARTS LIST

| | |
|---|---|
| 110 | Computer System |
| 112 | Microprocessor-based Unit |
| 114 | Display |
| 116 | Keyboard |
| 118 | Mouse |
| 120 | Selector on Display |
| 122 | Disk Drive Unit |
| 124 | Compact Disk - read Only Memory (CD-ROM) |
| 126 | Floppy Disk |
| 127 | Network Connection |
| 128 | Printer |

-continued

PARTS LIST

| | |
|---|---|
| 130 | Personal Computer Card (PC card) |
| 132 | PC Card Reader |
| 134 | Digital Camera |
| 136 | Camera Docking Port |
| 138 | Cable Connection |
| 140 | Wireless Connection |
| 200 | Color search image |
| 202 | Color quantization step |
| 204 | Search window generation step |
| 205 | Subsampling step |
| 206 | Feature extraction step |
| 208 | Color model object image |
| 210 | Color quantization step |
| 212 | Feature extraction step |
| 214 | Similarity assessment step |
| 216 | Search window designation step |
| 300–306 | Color quantization sub-steps |
| 400–404 | Search window generation sub-steps |
| 500–524 | Search image prescreening sub-steps |
| 600–608 | Similarity assessment sub-steps |
| 702–708 | Search window designation sub-steps |
| 800–806 | Probability map generation sub-steps |

What is claimed is:

1. A method of finding a color object in a digital image, comprising the following steps:

(a) obtaining a search image that potentially includes the color object;

(b) capturing a single model image including a model of the color object;

(c) computing an edge Spatial Color Joint Probability Function (SCJPF) for the model image, wherein a model image edge SCJPF is a distribution of colors at color edges as well as spatial relationships between such colors in the model image, wherein a color edge is defined as a pixel whose color is different from its neighboring pixels according to a predetermined threshold;

(d) generating a plurality of search windows each comprising a portion of the search image;

(e) computing an edge SCJPF for each search window, wherein a search window SCJPF is a distribution of colors at color edges as well as spatial relationships between such colors in the search window;

(f) assessing a first degree of similarity between the model image edge SCJPF and each of the search window edge SCJPFs;

(g) computing a Spatial Color Joint Probability Function (SCJPF) for the model image, wherein a model image SCJPF is a distribution of colors as well as spatial relationships between such colors in the model image;

(h) computing a SCJPF for each search window, wherein a search window SCJPF is a distribution of colors as well as spatial relationships between such colors in the search window;

(i) assessing a second degree of similarity between the model image SCJPF and the search window SCJPF; and (j) designating a search window associated with (1) search window edge SCJPFs having a first degree of similarity to the model image edge SCJPFs which exceeds a first prescribed search threshold and (2) a search window SCJPF having a second degree of similarity to a model image SCJPF which exceeds a second prescribed search threshold as potentially containing the object being sought.

2. The method as claimed in claim 1 further comprising the step of performing color quantization on both the model image and the search image, wherein the number of unique colors in the images is reduced to a set of pre-determined perceptually related color names.

3. The method as claimed in claim 2 wherein the color quantization step is further comprised of the steps of:
converting each pixel value in the model image and the search image to a suitable color space;
assigning each pixel a color name based on the location of its color value within the color space; and
assigning each pixel a quantized color value based on its assigned color name.

4. The method as claimed in claim 2 wherein the reduced set of pre-determined perceptually related color names includes human skin color.

5. The method as claimed in claim 2 wherein the step of performing color quantization further includes mapping the color of a pixel to more than one color name in the reduced set of pre-determined perceptually related color names.

6. The method as claimed in claim 1 wherein each search window is within a region of the image having a minimum predefined number of the colors present in the object model image.

7. The method as claimed in claim 1 wherein the step (1) of designating search windows employs a similarity assessment that is performed by mathematical correlation of the model image SCJPF and each of the search window SCJPFs, and the model image color histogram and each of the search window color histograms.

8. The method as claimed in claim 1 wherein the step (e) of computing a Spatial Color Joint Probability Function (SCJPF) for each search window further includes computing a first partial SCJPF for a part of the search window that does not overlap with a previously-visited search window, and adding the first partial SCJPF to a second partial SCJPF computed from the previously-visited search window.

9. The method as claimed in claim 1 further including a step of pre-screening the search image to identify regions that are more likely to contain the color object before generating a plurality of search windows in step (d), thereby eliminating regions that are less likely to contain the color object and that do not therefore warrant further processing.

10. The method of claim 9 wherein said pre-screening step includes the following:
identifying the important colors in object model image;
identifying pixels in search image which contain in their neighborhoods at least a predefined number of the important model image colors;
creating a binary mask of matching neighborhood centers;
performing connected component analysis; and
determining minimum enclosing rectangle of each connected component, the set of rectangles determined making up the set of search regions that may contain the target object.

11. The method of claim 9 wherein said pre-screening step includes the following:
computing the color co-occurrence histogram of object model image;
generating a probability map image by random examination of pixel pairs in search image and comparison to model image SCJPF;
performing low-pass filtering on probability map;
thresholding the probability map at a predefined level;
performing connected component analysis; and
determining the minimum enclosing rectangle of each connected component to generate the set of search regions.

12. A method of finding a color object in a digital, comprising the following steps:
obtaining a search image that potentially includes the color object;
capturing a single model image including a model of the color object;
generating a plurality of search windows each comprising a portion of the search image;
computing a probability function for the model image and for each of the search windows, said probability function being
an edge Spatial Color Joint Probability Function, wherein the model image probability function and search window probability function are each a distribution of colors at color edges as well as spatial relationships between such colors in the respective model image or search window, respectively, wherein a color edge is defined as a pixel whose color is different from its neighboring pixels according to a predetermined threshold;
assessing a degree of similarity between the model image probability function and each of the search window probability functions; and
designating search windows associated with the search window probability functions having a degree of similarity to the model image probability function which exceeds a prescribed search threshold as potentially containing the object being sought.

* * * * *